United States Patent [19]
Saeki et al.

[11] Patent Number: 5,625,237
[45] Date of Patent: Apr. 29, 1997

[54] REMOVE POWER SOURCE DEVICE HAVING IMPROVED CAPACITY INDICATION CAPABILITY, AND AN ELECTRONIC DEVICE USING THE REMOVABLE POWER SOURCE DEVICE

[75] Inventors: Mituo Saeki; Masafumi Okumura; Hidekiyo Ozawa, all of Kawasaki, Japan

[73] Assignee: Fujitsu Limited, Kawasaki, Japan

[21] Appl. No.: 496,616

[22] Filed: Jun. 29, 1995

[30] Foreign Application Priority Data

Nov. 9, 1994 [JP] Japan ................... 6-274739

[51] Int. Cl.⁶ .................................... H02J 1/16
[52] U.S. Cl. ................ 307/48; 307/64; 307/66; 320/5; 320/9; 320/30; 320/32; 320/43; 320/48; 320/53; 364/483; 364/492
[58] Field of Search .................. 307/64, 66, 48, 307/43, 44, 46, 82; 320/5, 9, 30, 32, 43, 48, 53; 364/483, 492; 363/15

[56] References Cited

U.S. PATENT DOCUMENTS

4,792,743 12/1988 Tsujino et al. .................. 320/15
5,422,822 6/1995 Toyota et al. .................. 364/483

Primary Examiner—William M. Shoop, Jr.
Assistant Examiner—Kim Lockett
Attorney, Agent, or Firm—Nikaido, Marmelstein, Murray & Oram LLP

[57] ABSTRACT

A power source device capable of using both an external DC power source and a battery contained therein, and an electronic device using this power source device. A circuit is provided to measure the battery voltage, to calculate the remaining capacity of the battery and to indicate the remaining capacity. Means is provided which detects the state where no battery is mounted in the power source device, and short-circuits the input side of the battery voltage-measuring circuit. When no battery is mounted, therefore, a voltage leaking from the external DC power source is not erroneously measured as the battery voltage, and the remaining amount of power of the battery is correctly calculated.

34 Claims, 4 Drawing Sheets

REMOVE POWER SOURCE DEVICE HAVING IMPROVED CAPACITY INDICATION CAPABILITY, AND AN ELECTRONIC DEVICE USING THE REMOVABLE POWER SOURCE DEVICE

BACKGROUND OF THE INVENTION

1. Field of the Invention

The present invention relates to a power source device capable of correctly indicating the remaining capacity of a battery and to an electronic device using the power source device.

2. Description of the Related Art

In recent years, portable electronic devices such as notebook-type personal computers, portable telephones and the like have been extensively used. Such electronic devices use a battery as a power source. In general, however, a secondary, or rechargeable battery such as a NiCd (nickel-cadmium) battery, NiMH (nickel-metal hydrogen) battery, lithium ion (Li+) and the like is used from the viewpoint of operation cost of the device, current capacity that can be obtained instantaneously, etc. In many cases, furthermore, the electronic device contains a charging circuit so that the secondary battery contained therein can be easily electrically charged by simply connecting an AC adapter to the electronic device.

When used on a desk, the portable electronic device operates from electric power supplied from an external DC power source such as an AC adapter or the like, and the user may use the device without concern about the remaining capacity of the battery. When the user carries the device with him, however, the device operates on power from the battery only. Therefore, the user must monitor the remaining capacity of the battery. In a data processor such as a notebook-type personal computer, in particular, the data being processed may be deleted if the battery is depleted. Therefore, the user must remain aware of the remaining battery capacity and be sure to save data on a nonvolatile memory medium such as a floppy disk before the battery is depleted.

To avoid this trouble, some recent notebook-type personal computers are equipped with a remaining capacity display function for letting the user know the remaining capacity of the battery. The method of estimating the remaining capacity of the battery can be divided into two types; i.e., a method of estimating the remaining capacity by subtracting the electric power that is used from the capacity of the battery and a method of estimating the remaining capacity by relying upon the voltage of the battery.

In the case of a battery (lithium ion secondary battery (Li+) and the like battery) having a characteristic that the battery voltage drops in proportion to the amount of electric discharge, it is possible to estimate the remaining capacity of the battery by providing a circuit that measures the battery voltage.

A power source device equipped with such a battery voltage-measuring circuit is constituted as described below. The power source device has a connector which receives a DC electric power from an external unit such as an AC adapter. The battery is held in a battery unit and is removably mounted in the power source device. The external DC power source and the battery are connected to the input side of a DC-DC converter which converts the external DC power or the battery voltage into a voltage needed by the load of the electronic device. The output of the DC-DC converter is connected to the load in the electronic device. Provision is made of a charging circuit for electrically charging the secondary battery from the external DC power source. A blocking diode is connected between the connector and the DC-DC converter in order to prevent the electric power of the battery from leaking to the external side. When the external DC power is used, furthermore, a blocking diode is connected between the battery and the DC-DC converter in order to prevent the electric power from being fed to the battery from the external DC power source.

The voltage across the terminals of the battery is divided by voltage-dividing resistors and is input to a voltage-measuring circuit. The remaining capacity of the battery is indicated based upon the battery voltage measured by the voltage-measuring circuit. When the battery is connected to the power source device, the voltage-measuring circuit correctly measures the battery voltage. When the external DC power source is used and the battery is removed from the power source device, however, the voltage of the external DC power source appears on the voltage-measuring circuit. The blocking diode between the external DC power source and the battery as described above, prevents current from flowing into the battery from the external DC power source. In practice, however, the blocking diode permits a reverse leakage current to flow, and a voltage appears on the voltage-measuring circuit. The voltage-measuring circuit measures the voltage as a battery voltage. Therefore, there occurs an erroneous operation in that a remaining amount of power of the battery is indicated despite the fact that the battery has not really been connected to the power source device. To prevent the occurrence of erroneous operation, a means can be employed in which the resistance of the voltage-dividing resistors for measuring the voltage is decreased with respect to the reverse impedance of the blocking diode. When the voltage-dividing resistors have a decreased resistance, however, the electric power is consumed in an increased amount when the cell is being used, resulting in a decrease in the time for using the battery.

SUMMARY OF THE INVENTION

It is therefore an object of the present invention to provide a power source device which is capable of correctly indicating the remaining capacity of a battery without erroneously operating the voltage-measuring circuit even in a state where an external DC power source is used and the battery is removed from the power source device, and an electronic device using the power source device.

Another object of the present invention is to provide a power source device which is capable of decreasing the amount of electric power consumed by the voltage-dividing resistors which are connected to the battery for measuring the battery voltage and of extending the time for using the battery, and an electronic device using the same power source device.

In order to accomplish the above-mentioned object, the present invention utilizes a mount detecting circuit which detects the battery that is mounted in the power source device. The mount detecting circuit is usually provided to let the user know that the battery has been mounted in the power source device. In the present invention, when it is detected by the mount detecting circuit that the battery has been removed from the power source device, the positive terminal of the battery and ground are short-circuited, or voltage-measuring circuit and ground are short-circuited. Therefore, the voltage-measuring circuit does not detect the battery voltage. On the other hand, when it is detected by the mount detecting circuit that the battery has been mounted in the power source device, the positive terminal of the battery and ground that had been short-circuited are opened, or the voltage-measuring circuit and ground that had been short-circuited are opened. Therefore, the battery voltage is applied to the voltage-dividing resistors and the voltage-measuring circuit measures the battery voltage. In the power source device of the present invention as described above, the voltage-dividing resistors are connected across the terminals of the battery only when the battery is connected. Therefore, the resistance is so increased as to decrease the consumption of electric power enabling the battery to be used for extended periods of time.

BRIEF DESCRIPTION OF THE DRAWINGS

The above objects and features of the present invention will be more apparent from the following description of the preferred embodiments with reference to the accompanying drawings, wherein.

DESCRIPTION OF THE PREFERRED EMBODIMENTS

Figure 1:
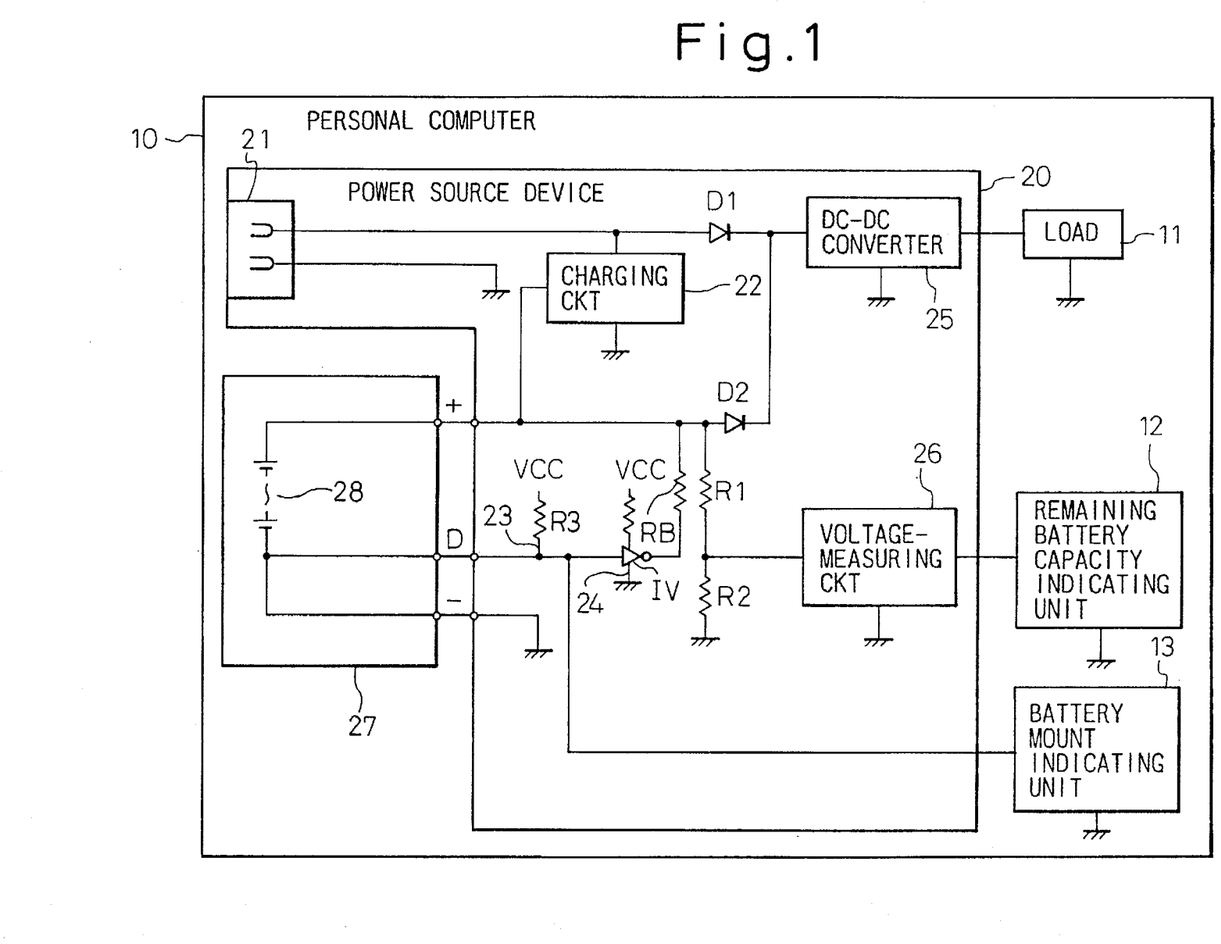
FIG. 1 illustrates a circuit according to a first embodiment of the present invention.

FIG. 1 is a circuit diagram illustrating a first embodiment of the present invention, wherein reference numeral 10 denotes a portable personal computer, and 20 denotes a power source device contained in the personal computer 10. In the power source device 20, reference numeral 21 denotes a connector for connection to an AC adapter which is an external DC power source. The connector 21 is connected to the input side of a DC-DC converter 25. A blocking diode D1 is connected between the positive pole side of the connector 21 and the DC-DC converter 25. The DC-DC converter 25 is a widely known one and its contents are not described here in detail. The output of the DC-DC converter 25 is fed to a load 11 in the personal computer 10.

Reference numeral 27 denotes a battery unit which contains a secondary battery 28 and is detachably mounted to the power source device 20. For the secondary battery 28, use is made of a battery such as a lithium ion battery of which the battery voltage drops depending upon the amount of discharge. The battery unit 27 is equipped with a connection terminal "+" on the positive pole side of the battery 28, a connection terminal "−" on the negative pole side, and a mount detecting terminal D that is used for detecting whether the battery is mounted or not. The power source device 20 is also equipped with a connection terminal "+" on the positive pole side, a connection terminal "−" on the negative pole side, and a mount detecting terminal D. When the battery unit 27 is mounted to the power source device 20, the mount detecting terminal D is connected to ground. When the battery unit 27 is removed from the power source device 20, the mount detecting terminal D assumes an open potential. At the mount detecting terminal, a switch can be used which is turned on and is connected to ground potential when the battery unit 27 is mounted to the power source device 20. When the battery unit 27 is mounted to the power source device 20, the positive pole side of the secondary battery 28 is connected to the input side of the DC-DC converter 25 through a blocking diode D2, the negative pole side is connected to ground via the connection terminal "−", and the mount detecting terminal D is connected to the mount detecting circuit 23.

Voltage-dividing resistors R1, R2 for measuring voltage are connected between the positive pole side of the secondary battery 28 and ground, and a divided voltage is input to a voltage-measuring circuit 26. The output of the voltage-measuring circuit 26 is input to a remaining battery capacity indicating unit 12.

A charging circuit 22 is connected between the connector 21 and the battery circuit. The charging circuit 22 is a widely known one and its details are not described here. It is desired that the charging circuit 22 is one which detects the voltage of external DC power source and commences the electric charging when a drop in the battery voltage is detected.

The mount detecting circuit 23 is constituted by a resistor R3 of which one terminal is connected to a voltage Vcc and of which the other terminal is connected to the mount detecting terminal D. The mount detecting circuit 23 is connected to a control circuit 24 and to a battery mount indicating unit 13.

The control circuit 24 is constituted by an inverter IV of the open-drain type. The inverter IV opens its output or is switched to ground potential. The output of the control circuit 24 is connected to the positive pole side of the secondary battery 28 via a resistor RB which has a small resistance.

The battery mount indicating unit 13 indicates whether the battery has been mounted in the power source device 20 or not.

The operation of the circuit of FIG. 1 is described below.

First, the case where the AC adapter has not been connected to the connector 21 but the battery unit 27 is mounted, is described. The DC-DC converter 25 converts a voltage fed from the secondary battery 28 into a predetermined voltage and feeds it to the load 11. At this moment, the charging circuit 22 does not work. The battery voltage is applied to the voltage-dividing resistors R1 and R2, and the voltage-measuring circuit 26 measures the battery voltage, calculates the remaining amount of battery power based upon the measured voltage, and indicates the value on the remaining battery capacity indicating unit 12.

Figure 2:
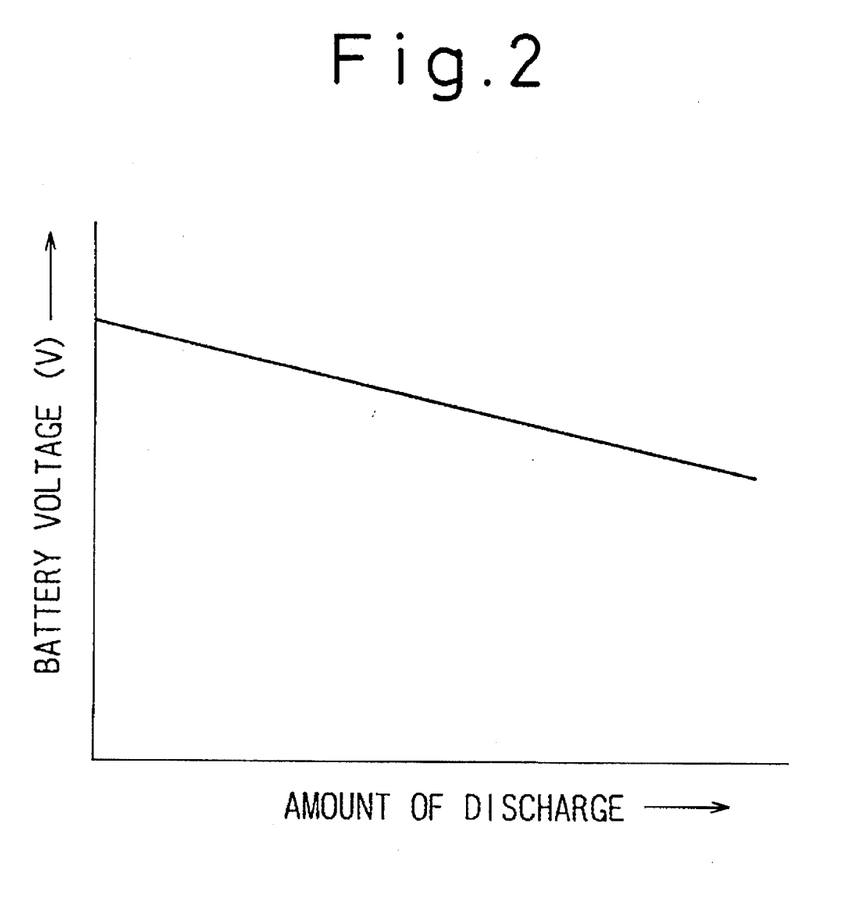
FIG. 2 is a graph illustrating a relationship between the battery voltage and the amount of electric discharge of a battery.

FIG. 2 shows a relationship between the battery voltage and the remaining capacity of the battery. The voltage of a battery, such as a lithium ion battery, decreases with an increase in the amount of discharge. The remaining capacity of the battery is the difference between the capacity of the battery and the amount of discharge. Therefore, the voltage-measuring circuit 26 calculates the remaining capacity of the battery in compliance with a suitable formula based upon the battery voltage.

The input sides of the mount detecting circuit 23 and control circuit 24 of FIG. 1 are connected to ground via the mount detecting terminal D, battery unit 27 and connection terminal "−" of the negative pole side. The battery mount indicating unit 13 indicates that the battery is mounted in the power source device when its input assumes ground potential. Moreover, the input of the inverter IV assumes the low level and its output assumes an open potential. As a result, the lower end of the resistor RB is opened and the resistor RB does not serve as a load for the secondary battery 28.

Next, described below is the case where the AC adapter is connected to the connecter 21 in a state where the battery unit 27 has been mounted in the power source device 20, and the external DC power source is fed to the power source device 20. The voltage of the external DC power source has been set to be higher than the voltage of the secondary battery 28 and, hence, the DC-DC converter 25 converts the voltage of the external DC power into a predetermined voltage and feeds it to the load 11. Furthermore, the charging circuit 22 charges the secondary battery 28 from the external DC power source. Operation of the charging circuit 22 is well known and is not described here in detail.

The voltage-measuring circuit 26 measures the battery voltage, and the resistor RB has its lower end open and does not serve as a load on the secondary battery 28 in the same manner as in the above-mentioned case of where the AC adapter is connected to the connector 21.

Finally, described below is the case where the battery unit 27 is not mounted in the power source device 20 in a state where the AC adapter has been connected to the connector 21. The DC-DC converter converts a voltage supplied from the external DC power source into a predetermined voltage and feeds it to the load 11. The charging circuit 22 detects that the secondary battery 28 has not been connected and does not perform the charging operation. Since the battery unit 27 has not been mounted, the mount detecting terminal D is not connected to ground. Accordingly, the mount detecting circuit 23 assumes the voltage Vcc, and the battery mount indicating unit 13 indicates that no battery has been mounted in the power source device. The output terminal of the inverter IV of the control circuit 24 assumes ground potential. As a result, the connection terminal "+" of the positive pole side is connected to ground via low resistance RB. Accordingly, a reverse leakage current flows into the connection terminal "+" of the positive pole side from the external DC power source via the blocking diode D2. Here, however, the blocking diode D2 has a large impedance in the reverse direction and the resistor RB has a small resistance, whereby the voltage-measuring circuit 26 measures a very small voltage. Accordingly, the remaining battery capacity indicating unit 12 does not indicate the remaining capacity of the battery.

As will be obvious from the foregoing description, resistances of the voltage-dividing resistors R1 and R2 can be determined by taking into consideration only the state where the battery unit 27 is mounted in the power source device 20. That is, the resistances can be determined without at all taking into consideration the reverse leakage current from the blocking diode D2. It is therefore allowed to increase the resistances of the voltage-dividing resistors R1 and R2 so that the electric power of the battery is consumed in decreased amounts by the voltage-dividing resistors R1 and R2. It is further allowed to use the blocking diode D2 which permits the voltage to drop only slightly in the forward direction, i.e., which has a large reverse leakage current, making it possible to decrease the amount of electric power consumed by the blocking diode D2 when the electric power is supplied from the secondary battery 28. Accordingly, the electric power of the secondary battery 28 is consumed only slightly by the voltage-dividing resistors R1, R2 and by the reverse-current preventing diode D2, enabling the battery 28 to be used for extended periods of time.

Figure 3:
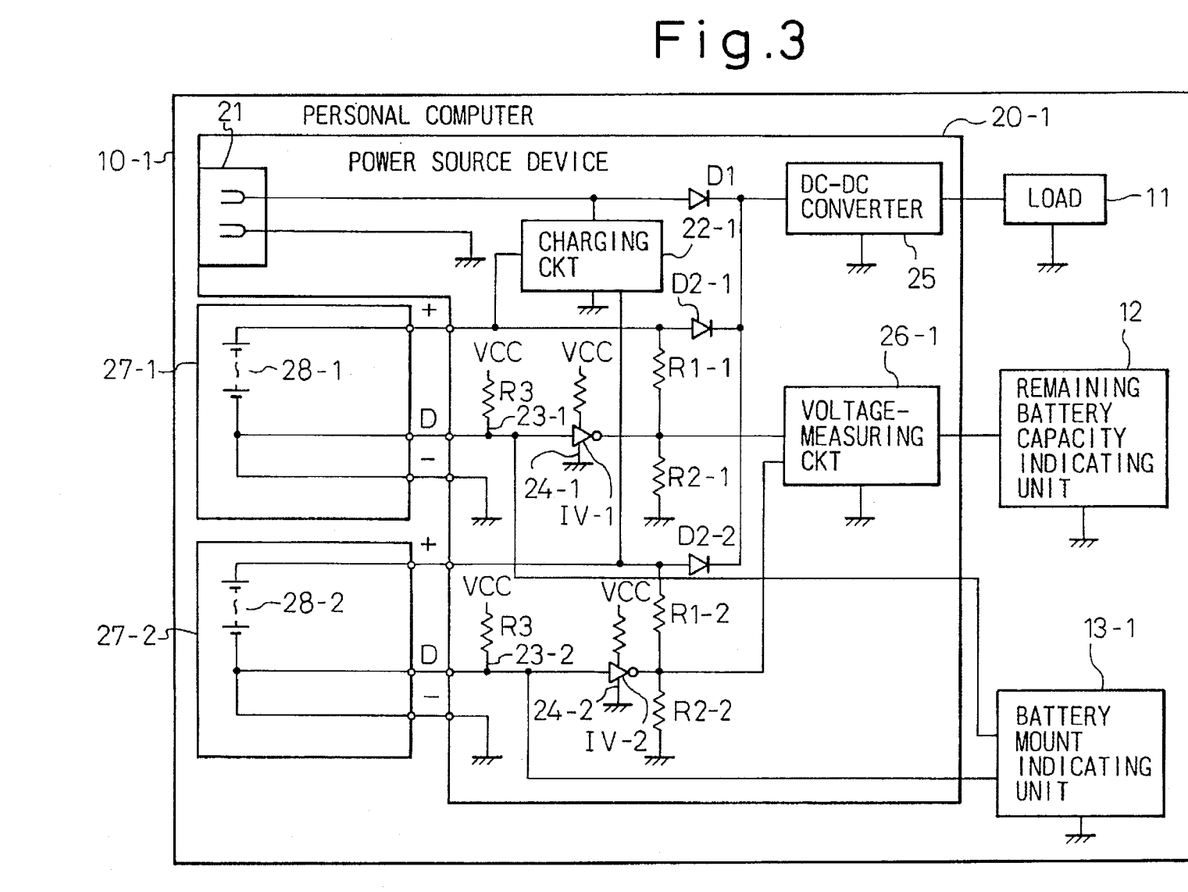
FIG. 3 illustrates a circuit according to a second embodiment of the present invention.

FIG. 3 is a circuit diagram illustrating a second embodiment of the present invention. In FIG. 3, a portable personal computer 10-1 contains a power source device 20-1. In the power source device 20-1, the connector 21, blocking diode D1 and DC-DC converter 25 are the same as those of the circuit of FIG. 1 described above, and are not described here again. The battery units and the accessory circuits are provided in two groups which are the same. Therefore, only the first group is described, since the description of the second group is the same. The two groups are distinguished from each other by adding −1 or −2 respectively to the reference numerals thereof.

A first power source unit 27-1 holds secondary battery 28-1. The power source unit 17-1 and the power source device 20-1, respectively, have a connection terminal "+" of the positive pole side, a connection terminal "−" of the negative pole side and a mount detecting terminal D in the same manner as the circuit of FIG. 1. When the battery unit 27-1 is mounted on the power source device 20-1, the positive pole side of the secondary battery 28-1 is connected to the input side of the DC-DC converter 25 via a blocking diode D2-1, and the negative pole side thereof is connected to ground and to a mount detecting circuit 23-1.

Voltage-dividing resistors R1-1 and R2-1 for measuring voltage are connected between the positive pole side of the secondary battery 28-1 and ground, and a divided voltage is input to the voltage-measuring circuit 26. The output of the voltage-measuring circuit 26-1 is input to the remaining battery capacity indicating unit 12. The voltage-measuring circuit 26-1 receives a voltage divided by the first voltage-dividing resistors R1-1 and R2-1, as well as a voltage divided by the second voltage-dividing resistors R1-2 and R2-2.

A mount detecting circuit 23-1 connected to the negative pole side of the battery 28-1 is connected to a control circuit 24-1 and to a battery mount indicating unit 13-1. The mount detecting circuit 23-1 and the control circuit 24-1 are constituted in the same manner as the mount detecting circuit 23 and the control circuit 24 of FIG. 1. Here, however, the output of the control circuit 24-1 is connected to a point where the voltage-dividing resistors R1 and R2 are connected together, i.e., to the input side of the voltage-measuring circuit 26-1. Furthermore, the mount indicating circuit 13-1 indicates whether the batteries are mounted in the power source device 20-1 for each of the two battery units 27-1 and 27-2.

The charging circuit 22-1 is connected at its input side to the connector 21. The output side thereof is connected to a circuit connected to the battery unit 27-1 and to a circuit connected to the battery unit 27-2.

Described below is the operation of the circuit of FIG. 3.

The operation of the circuit of FIG. 3 is basically the same as the operation of the circuit of FIG. 1 and, hence, the overlapping portions are not described. Described below are only those portions different from the operation of the circuit of FIG. 1.

When either the battery unit 27-1 or the battery unit 27-2 is mounted in a state where the AC adapter has not been connected to the connector 21, the DC-DC converter 25 converts the voltage fed from the battery that is mounted to a predetermined voltage, and feeds it to the load 11. When the two batteries are connected, the electric power is supplied from the two batteries, as a matter of course.

Operation on the output side of the control circuit 24-1 will be described next. When the battery unit 27-1 is mounted, the input of the control circuit 24-1 assumes ground potential, the output of the control circuit 24-1 is opened, a voltage divided by the voltage-dividing resistors R1-1 and R2-1 is applied to the voltage-measuring circuit 26-1, and the voltage-measuring circuit 26-1 calculates the remaining capacity for each of the two batteries based upon the measured voltages. When the battery unit 27-1 has not been mounted, the output of the mount detecting circuit 23-1 assumes the high level and the output of the control circuit 24-1 assumes ground potential. Therefore, the input to the voltage-measuring circuit 26-1 assumes ground potential, and the voltage-measuring circuit 26-1 does not detect the voltage. In the state where the battery unit 27-1 is not mounted, the reverse current flowing through the blocking diode D2 flows into the voltage-dividing resistors R1-1 and R2-1 only. Compared with the device in which the reverse current flows into the resistor RB of a small resistance as in the above-mentioned circuit of FIG. 1, therefore, a decreased amount of reverse current flows through the blocking diode D2. In the circuit shown in FIG. 3, when one battery unit is not mounted, the leakage electric power may be fed from the other battery unit. It is therefore important to decrease the reverse current.

Figure 4:
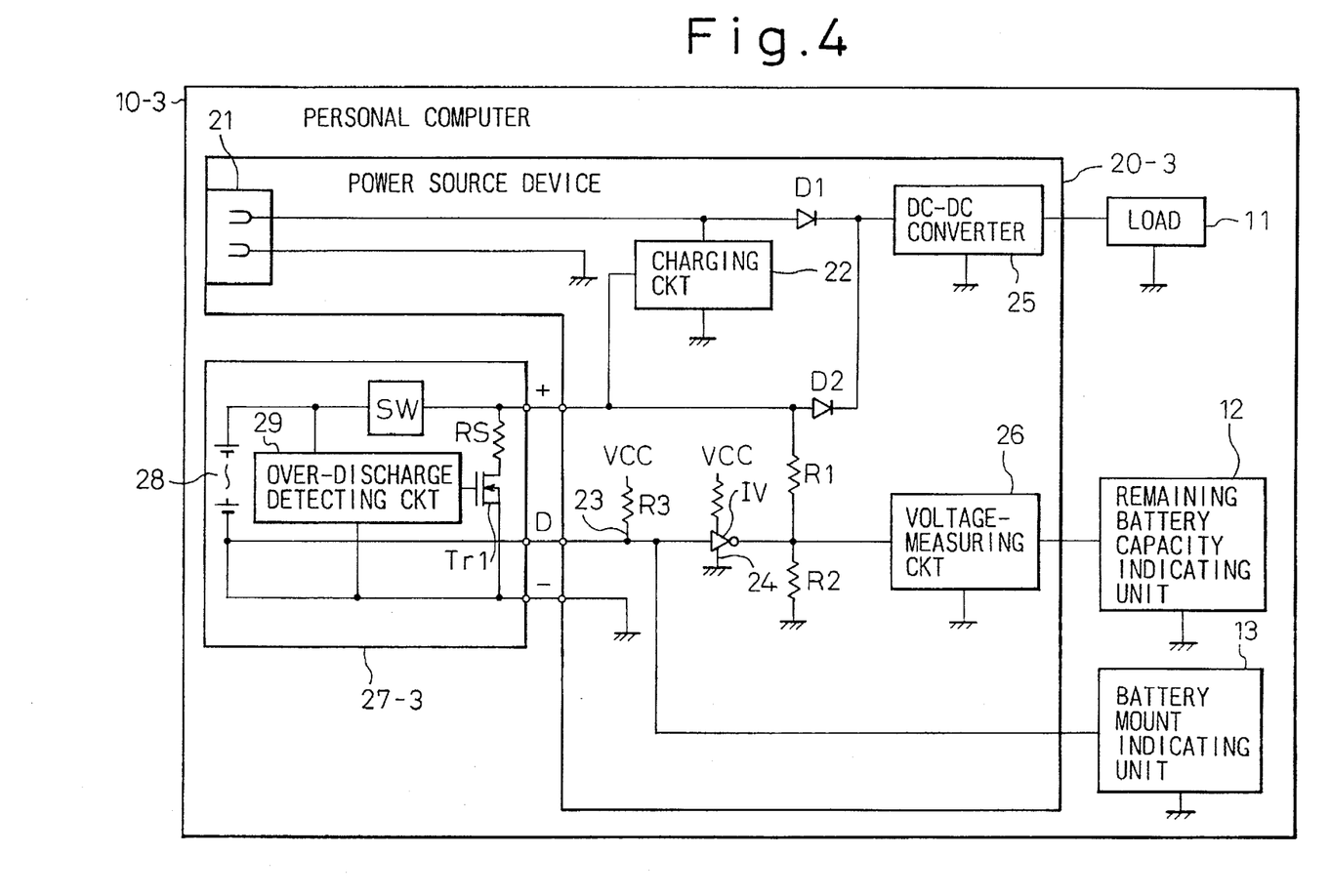
FIG. 4 illustrates a circuit according to a third embodiment of the present invention.

FIG. 4 is a circuit diagram according to a third embodiment of the present invention. Among secondary batteries, lithium ion batteries and NiMH batteries are susceptible to over-discharge and can be damaged to such a degree that they cannot be recovered when they are over-discharged. Therefore, an over-discharge preventing circuit has been employed even in conventional power source devices. FIG. 4 illustrates a circuit of a power source device provided with an over-discharge detecting circuit according to an embodiment of the invention.

In the circuit of FIG. 4, the connector 21, blocking diode D1 and DC-DC converter 25 are the same as those of the circuits of FIGS. 1 and 3. A single battery unit 27-3 and the related circuit are provided as in the circuit of FIG. 1. Moreover, the output of the control circuit 24 is connected to a point where the voltage-dividing resistors R1 and R2 are connected together as in the circuit of FIG. 3. Accordingly, the same portions as those mentioned above are not described here again. The only difference between the circuit of FIG. 4 and the circuits of FIGS. 1 and 3 is the constitution of the battery unit 27-3. Therefore, only the constitution of the battery unit 27-3 and its operation are described below.

An over-discharge detecting circuit 29 is connected to the output side of the secondary battery 28. The over-discharge detecting circuit 29 may be one that has heretofore been known. A switch SW is connected in series with the positive pole side of the secondary battery 28. A resistor Rs having a small resistance and a transistor Tr1 are connected in series between the output side of the switch SW and the negative pole side of the secondary battery 28. The switch SW and the transistor Tr1 are turned on and off by the over-discharge detecting circuit 29.

The over-discharge detecting circuit 29 monitors the voltage of the secondary battery 28, and turns the switch SW on and the transistor Tr1 off when the battery voltage is normal. When the remaining capacity of the battery is larger than a predetermined value, therefore, the output of the secondary battery 28 is fed to the blocking diode D2 and the voltage-dividing resistors R1, R2. As the discharge of the secondary battery 28 proceeds and the battery voltage becomes lower than a predetermined value, the over-discharge detecting circuit 29 turns the switch SW off and the transistor Tr1 on. With the switch SW being turned off, the secondary battery 28 is removed from the circuit; i.e., the secondary battery 28 is not discharged any further and is prevented from being over-discharged. When the transistor Tr1 is turned on, furthermore, the voltage-dividing resistors R1 and R2 are short-circuited by the resistor Rs having a small resistance, and the voltage-measuring circuit 26 does not measure the voltage of the secondary battery 28. Accordingly, the voltage-measuring circuit 26 does not erroneously operate even when the voltage is applied to the voltage-dividing resistors R1 and R2 from the external DC power source through the blocking diode D2.

We claim:

1. A power source device comprising:

first input terminals for connection to an external DC power source;

output terminals;

second input terminals for connection to a battery;

a blocking diode, connected between said output terminals and the second input terminals, said blocking diode preventing a flow of current from the external DC power source to the second input terminals via the first input terminals;

a voltage-measuring circuit for measuring a voltage across the second input terminals;

a battery mount detecting means for detecting that a battery is connected to the second input terminals; and control means for short-circuiting the second input terminals when it is detected by the battery mount detecting means that a battery has not been connected to the second input terminals.

2. A power source device according to claim 1, which further comprises a DC-DC converter for converting a voltage output at the output terminals into a predetermined voltage.

3. A power source device according to claim 1, which further comprises a blocking diode connected between the output terminal and the first terminal.

4. A power source device according to claim 1, wherein the control means short-circuits the second input terminals via a resistor.

5. A power source device according to claim 1, wherein voltage-dividing resistors are connected across the second input terminals, the voltage-measuring circuit measures the voltage at a point where the voltage-dividing resistors are connected together, and the control means short-circuits the input side of the voltage-measuring circuit.

6. A power source device according to claim 3, which further comprises a charging circuit connected between the first input terminals for connection to the external DC power source and the second input terminals.

7. A power source device according to claim 1, which further comprises a battery unit which has a battery-holding portion therein, is detachably mounted in the power source device, and further has a terminal for connecting the battery to the second input terminals.

8. A power source device according to claim 7, wherein the battery unit has a mount detecting terminal that is connected to the negative pole side of the battery, and the battery mount detecting means is connected to the mount detecting terminal when the battery unit is mounted in the power source device.

9. A power source device according to claim 1, wherein the battery unit comprises:

a first switch for turning the output of the battery on and off;

a second switch for short-circuiting the battery and the output side of the first switch via a resistor; and an over-discharge detecting circuit which detects the voltage of the battery and turns the first switch on and the second switch off when the battery voltage that is detected is larger than a predetermined value and turns said first switch off and the second switch on when the battery voltage that is detected is smaller than the predetermined value.

10. A power source device comprising:

first input terminals for connection to an external DC power source;

output terminals;

a plurality of second input terminals for connection to a plurality of batteries;

blocking diodes, connected between the output terminals and the second input terminals, for preventing a flow of current from the external DC power source to the second input terminals via the first input terminals;

a voltage-measuring circuit for measuring voltages across the second input terminals;

battery mount detecting means for detecting that batteries are connected to each of the second input terminals; and control means for short-circuiting input terminals to which no battery is connected when it is detected by the battery mount detecting means that no battery has been connected to the second input terminals.

11. A power source device according to claim 10, which further comprises a DC-DC converter for converting a voltage output at the output terminals into a predetermined voltage.

12. A power source device according to claim 10, which further comprises a blocking diode connected between the output terminal and the first input terminals.

13. A power source device according to claim 10, wherein voltage-dividing resistors are connected between the input terminals for connection to the batteries, the voltage-measuring circuit measures the voltage at points where the voltage-dividing resistors are connected together, and the control means short-circuits the input side of the voltage-measuring circuit.

14. A power source device according to claim 12, which further comprises a charging circuit connected between the first input terminals and each of the second input terminals.

15. A power source device according to claim 10, which further comprises battery units each of which has a battery-holding portion therein, is detachably mounted in the power source device, and further has terminals for connecting the battery to the second input terminals.

16. A power source device according to claim 15, wherein each of the battery units has a mount detecting terminal that is connected to the negative pole side of the battery, and the battery mount detecting means is connected to the mount detecting terminal when the battery unit is mounted in the power source device.

17. A power source device according to claim 10, wherein each of the battery units comprises:

a first switch for turning the output of the battery on and off;

a second switch for short-circuiting the battery and the output side of said first switch via a resistor; and an over-discharge detecting circuit which detects the voltage of the battery and turns the first switch on and the second switch off when the battery voltage that is detected is larger than a predetermined value and turns said first switch off and the second switch on when the battery voltage that is detected is smaller than the predetermined value.

18. An electronic device having a power source device which comprises:

first input terminals for connection to an external DC power source;

output terminals;

second input terminals for connection to cells;

a blocking diode, connected between said output terminals and the second input terminals, for preventing a flow of current from the external DC power source to the second input terminals via the first input terminals;

a voltage-measuring circuit for measuring a voltage across the second input terminals;

a battery mount detecting means for detecting that a battery is connected to the second input terminals; and control means for short-circuiting the second input terminals when it is detected by the battery mount detecting means that a battery has not been connected to the second input terminals.

19. An electronic device according to claim 18, which further comprises a DC-DC converter for converting a voltage output at the output terminals into a predetermined voltage.

20. An electronic device according to claim 18, which further comprises a blocking diode connected between the output terminal and the first terminals.

21. An electronic device according to claim 18, wherein the control means short-circuits the second input terminals via a resistor.

22. An electronic device according to claim 18, wherein voltage-dividing resistors are connected between the second input terminals, the voltage-measuring circuit measures the voltage at a point where said voltage-dividing resistors are connected together, and the control means short-circuits the input side of the voltage-measuring circuit.

23. An electronic device according to claim 20, which further comprises a charging circuit connected between the first input terminals and the second input terminals.

24. An electronic device according to claim 18, which further comprises a battery unit which has a battery-holding portion therein, is detachably mounted in the power source device, and further has a terminal for connecting a battery to the second input terminals.

25. An electronic device according to claim 24, wherein the battery unit has a mount detecting terminal that is connected to the negative pole side of the battery, and the battery mount detecting means is connected to the mount detecting terminal when the battery unit is mounted in the power source device.

26. An electronic device according to claim 18, wherein the battery unit comprises:

a first switch for turning the output of the battery on and off;

a second switch for short-circuiting the battery and the output side of the first switch via a resistor; and an over-discharge detecting circuit which detects the voltage of the battery and turns the first switch on and the second switch off when the battery voltage that is detected is larger than a predetermined value and turns said first switch off and the second switch on when the battery voltage that is detected is smaller than the predetermined value.

27. An electronic device having a power source device which comprises:

first input terminals for connection to an external DC power source;

output terminals;

second input terminals provided in a plural number for connection to a plurality of batteries;

blocking diodes, connected between the output terminals and the second input terminals, for preventing a flow of current from the external DC power source to the second input terminals via the first input terminals;

a voltage-measuring circuit for measuring voltages across the second input terminals;

battery mount detecting means for detecting that batteries are connected to each of the second input terminals; and control means for short-circuiting input terminals to which no battery is connected when it is detected by the battery mount detecting means that no battery has been connected to the second input terminals.

28. An electronic device according to claim 27, which further comprises a DC-DC converter for converting a voltage output at the output terminals into a predetermined voltage.

29. An electronic device according to claim 27, which further comprises a blocking diode connected between the output terminal and the first input terminals.

30. An electronic device according to claim 27, wherein voltage-dividing resistors are connected between the second input terminals, the voltage-measuring circuit measures the voltage at points where the voltage-dividing resistors are connected together, and the control means short-circuits the input side of the voltage-measuring circuit.

31. An electronic device according to claim 29, which further comprises a charging circuit connected between the first input terminals and each of the second input terminals.

32. An electronic device according to claim 27, which further comprises battery units each of which has a battery-holding portion therein, is detachably mounted in the power source device, and further has terminals for connecting the batteries to the second input terminals.

33. An electronic device according to claim 32, wherein each of the battery units has a mount detecting terminal that is connected to the negative pole side of the battery, and the battery mount detecting means is connected to the mount detecting terminal when the battery unit is mounted in the power source device.

34. An electronic device according to claim 27, wherein each of the battery units comprises:

a first switch for turning the output of a battery on and off;

a second switch for short-circuiting the battery and the output side of said first switch via a resistor; and an over-discharge detecting circuit which detects the voltage of the battery and turns the first switch on and the second switch off when the battery voltage that is detected is larger than a predetermined value and turns said first switch off and the second switch on when the battery voltage that is detected is smaller than the predetermined value.

* * * * *